(12) United States Patent
Stone et al.

(10) Patent No.: US 10,523,276 B2
(45) Date of Patent: Dec. 31, 2019

(54) WIRELESS POWER RECEIVER WITH MULTIPLE RECEIVER COILS

(75) Inventors: Martin Stone, San Diego, CA (US); Edward Kenneth Kallal, San Diego, CA (US); Francesco Carobolante, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1324 days.

(21) Appl. No.: 13/450,369

(22) Filed: Apr. 18, 2012

(65) Prior Publication Data

US 2013/0043734 A1 Feb. 21, 2013

Related U.S. Application Data

(60) Provisional application No. 61/524,195, filed on Aug. 16, 2011.

(51) Int. Cl.
| | |
|---|---|
| *H02J 50/12* | (2016.01) |
| *H02J 50/60* | (2016.01) |
| *H04B 5/00* | (2006.01) |
| *H02J 50/40* | (2016.01) |
| *H02J 5/00* | (2016.01) |
| *H02J 7/02* | (2016.01) |
| *H04B 7/08* | (2006.01) |

(52) U.S. Cl.
CPC .......... *H04B 5/0037* (2013.01); *H02J 5/005* (2013.01); *H02J 7/025* (2013.01); *H02J 50/12* (2016.02); *H02J 50/40* (2016.02); *H02J 50/60* (2016.02); *H04B 5/0087* (2013.01); *H04B 7/08* (2013.01)

(58) Field of Classification Search
CPC .............................. H02J 17/00; H02J 17/7025

USPC ......................................................... 107/104
See application file for complete search history.

(56) References Cited

U.S. PATENT DOCUMENTS

| | | | |
|---|---|---|---|
| 6,134,130 A | 10/2000 | Connell et al. | |
| 7,948,781 B2* | 5/2011 | Esaka et al. | ................... 363/67 |
| 8,854,224 B2* | 10/2014 | Kirby | ..................... H02J 7/025 |
| | | | 340/636.1 |

(Continued)

FOREIGN PATENT DOCUMENTS

| | | |
|---|---|---|
| CN | 1912786 A | 2/2007 |
| CN | 101944780 A | 1/2011 |

(Continued)

OTHER PUBLICATIONS

International Search Report and Written Opinion—PCT/US2012/050588—ISA/EPO—dated Sep. 27, 2012.

*Primary Examiner* — Jared Fureman
*Assistant Examiner* — Emmanuel Dominique
(74) *Attorney, Agent, or Firm* — Polsinelli LLP

(57) ABSTRACT

Systems, methods and apparatus are disclosed for wireless power transfer using multiple receive coils. In one aspect a wireless power receiver is provided that is configured to receive wireless power from a wireless power transmit coil. The wireless power receiver includes a first receive coil having a first mutual coupling with the transmit coil. The wireless power receiver further includes a second receive coil having a second mutual coupling with the transmit coil. The wireless power receiver further includes a load coupled to at least one of the first receive coil and the second receive coil for receiving the wireless power.

28 Claims, 10 Drawing Sheets

(56) References Cited

U.S. PATENT DOCUMENTS

| | | | |
|---|---|---|---|
| 8,872,383 B2 * | 10/2014 | Kozakai | H02J 7/025 307/104 |
| 2003/0086282 A1 * | 5/2003 | Zeng | H02M 3/33592 363/95 |
| 2005/0225326 A1 * | 10/2005 | He et al. | 324/318 |
| 2008/0116847 A1 | 5/2008 | Loke et al. | |
| 2008/0172109 A1 * | 7/2008 | Rahman | A61N 1/37229 607/60 |
| 2008/0198100 A1 | 8/2008 | Itokawa et al. | |
| 2008/0298100 A1 * | 12/2008 | Esaka | H01F 38/14 363/67 |
| 2009/0111531 A1 | 4/2009 | Cui et al. | |
| 2009/0115406 A1 | 5/2009 | Anderson et al. | |
| 2009/0236140 A1 | 9/2009 | Randall | |
| 2010/0033021 A1 * | 2/2010 | Bennett | H02J 17/00 307/104 |
| 2010/0181961 A1 * | 7/2010 | Novak | H02J 7/025 320/108 |
| 2011/0018768 A1 * | 1/2011 | Thoen | 342/448 |
| 2011/0169338 A1 | 1/2011 | Kozakai | |
| 2011/0115303 A1 * | 5/2011 | Baarman | H02J 17/00 307/104 |
| 2011/0156640 A1 | 6/2011 | Moshfeghi | |
| 2011/0175455 A1 * | 7/2011 | Hashiguchi | 307/104 |
| 2011/0304216 A1 * | 12/2011 | Baarman | H02J 17/00 307/104 |
| 2012/0106207 A1 * | 5/2012 | Tsai | H01F 27/324 363/21.02 |
| 2012/0133216 A1 * | 5/2012 | Amma | H02J 5/005 307/104 |
| 2012/0139358 A1 * | 6/2012 | Teggatz | H01F 38/14 307/104 |
| 2012/0306282 A1 * | 12/2012 | Tan | H02J 5/005 307/104 |
| 2013/0314035 A1 * | 11/2013 | Kohlschmidt | H02J 7/025 320/108 |
| 2014/0047713 A1 * | 2/2014 | Singh | H01R 43/20 29/869 |

FOREIGN PATENT DOCUMENTS

| | | | | |
|---|---|---|---|---|
| EP | 2273650 A2 | 1/2011 | | |
| JP | 2003070170 A | 3/2003 | | |
| JP | 2006519580 A | 8/2006 | | |
| JP | 2007166763 A | 6/2007 | | |
| JP | 2008301645 A | 12/2008 | | |
| JP | 2011147271 A | 7/2011 | | |
| WO | WO2004073283 | * | 8/2004 | |
| WO | WO 2004073283 A2 | * | 8/2004 | A61L 2/10 |

* cited by examiner

WIRELESS POWER RECEIVER WITH MULTIPLE RECEIVER COILS

CROSS REFERENCE TO RELATED APPLICATIONS

The present Application for Patent claims priority to Provisional Application No. 61/524,195, entitled WIRELESS POWER RECEIVER WITH MULTIPLE RECEIVER COILS, filed Aug. 16, 2011, and assigned to the assignee hereof and hereby expressly incorporated by reference herein.

FIELD

The present invention relates generally to wireless power. More specifically, the disclosure is directed to wireless power receiver with multiple receive coils.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a wireless power receiver configured to receive wireless power from a wireless power transmit coil. The wireless power receiver includes a first receive coil having a first mutual coupling with the transmit coil. The wireless power receiver further includes a second receive coil having a second mutual coupling with the transmit coil. The second receive coil is designed for substantially the same frequency of operation as the first receive coil. The wireless power receiver further includes a load coupled to at least one of the first receive coil and the second receive coil. The load is configured to receive wireless power. An orientation of the first receive coil is variable with respect to an orientation of the second receive coil.

Another aspect of the subject matter described in the disclosure provides a wireless power receiver configured to receive wireless power from a wireless power transmit coil. The wireless power receiver includes a first receive coil having a first mutual coupling with the transmit coil. The wireless power receiver includes a second receive coil having a second mutual coupling with the transmit coil. The wireless power receiver includes a first load coupled to the first receive coil. The first load is configured to receive at least a portion of the wireless power. The wireless power receiver includes a second load coupled to the second receive coil. The second load is configured to receive at least a portion of the wireless power.

Another aspect of the subject matter described in the disclosure provides a method of receiving wireless power from a wireless power transmit coil. The method includes determining a first characteristic of a first receive coil. The first receive coil has a first mutual coupling with the transmit coil. The method further includes determining a second characteristic of a second receive coil. The second receive coil has a second mutual coupling with the transmit coil. The second receive coil is designed for substantially the same frequency of operation as the first receive coil. The method further includes selecting one of the first and the second receive coil, based on the first characteristic and the second characteristic. The method further includes coupling a load to the selected receive coil. An orientation of the first receive coil is variable with respect to an orientation of the second receive coil.

Another aspect of the subject matter described in the disclosure provides an apparatus for receiving wireless power from a wireless power transmitter. The apparatus includes first means for receiving wireless power from the transmitter. The apparatus further includes second means for receiving wireless power from the transmitter. The second means for receiving wireless power is designed for substantially the same frequency of operation as the first means for receiving wireless power. The apparatus further includes a load coupled to at least one of the first means for receiving wireless power and the second means for receiving wireless power. An orientation of the first means for receiving wireless power is variable with respect to an orientation of the means for receiving wireless power.

Another aspect of the subject matter described in the disclosure provides a non-transitory computer-readable medium including code that, when executed, causes an apparatus to determine a first characteristic of a first receive coil. The first receive coil has a first mutual coupling with a transmit coil configured to transmit wireless charging power. The medium further includes code that, when executed, causes the apparatus to determine a second characteristic of a second receive coil. The second receive coil has a second mutual coupling with the transmit coil. The second receive coil is designed for substantially the same frequency of operation as the first receive coil. The medium further includes code that, when executed, causes the apparatus to select one of the first and the second receive coil, based on the first characteristic and the second characteristic. The medium further includes code that, when executed, causes the apparatus to couple a load to the selected receive coil. An orientation of the first receive coil is variable with respect to an orientation of the second receive coil.

BRIEF DESCRIPTION OF THE DRAWINGS

FIG. 8 is yet another simplified block diagram of an exemplary wireless power transmission system.

Figure 1:
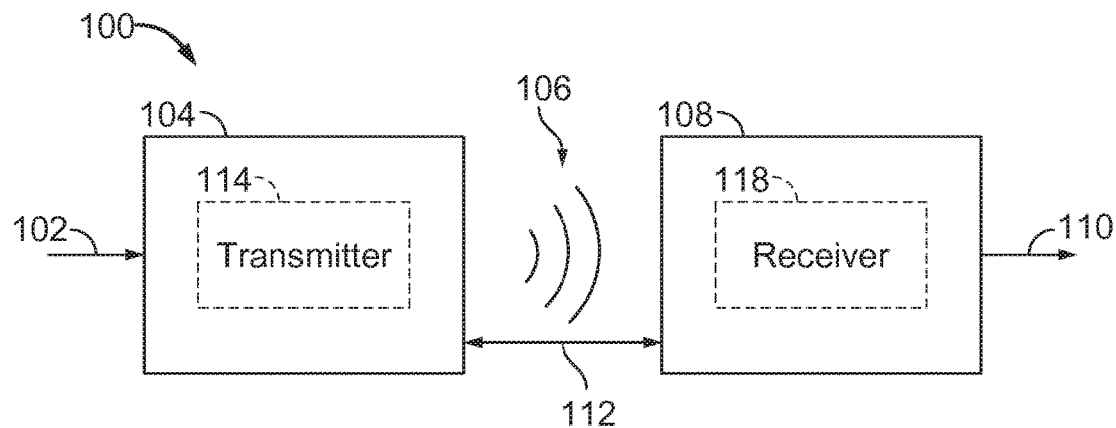
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
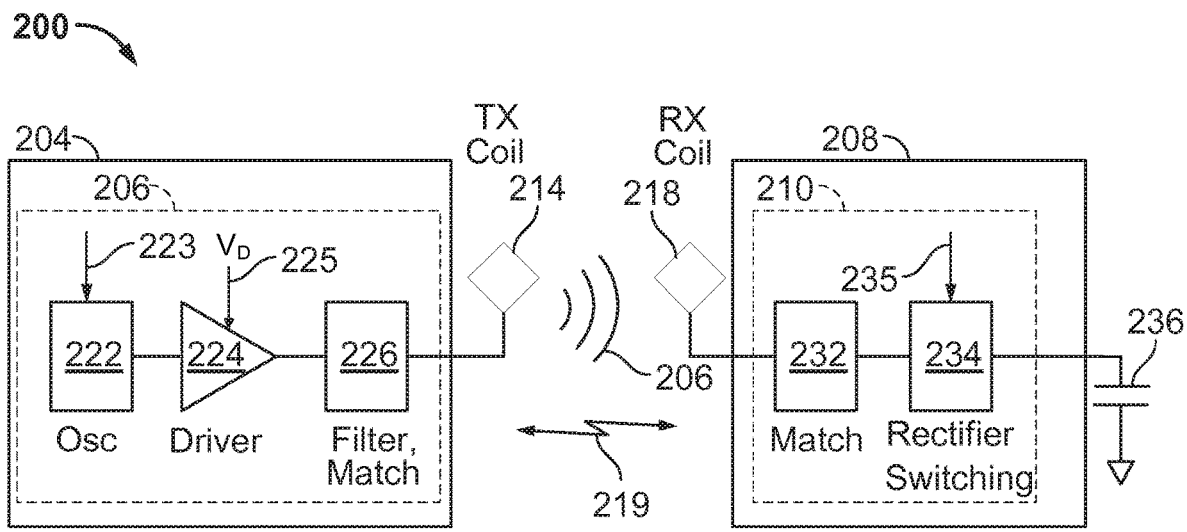
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
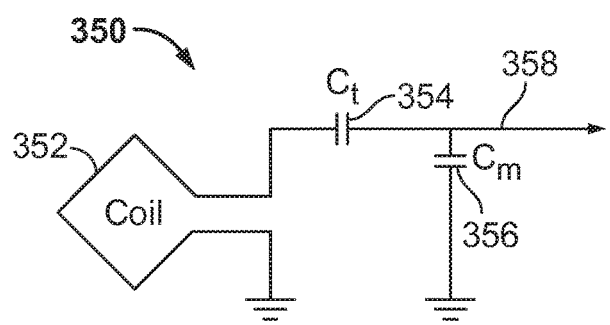
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy from coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 352. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
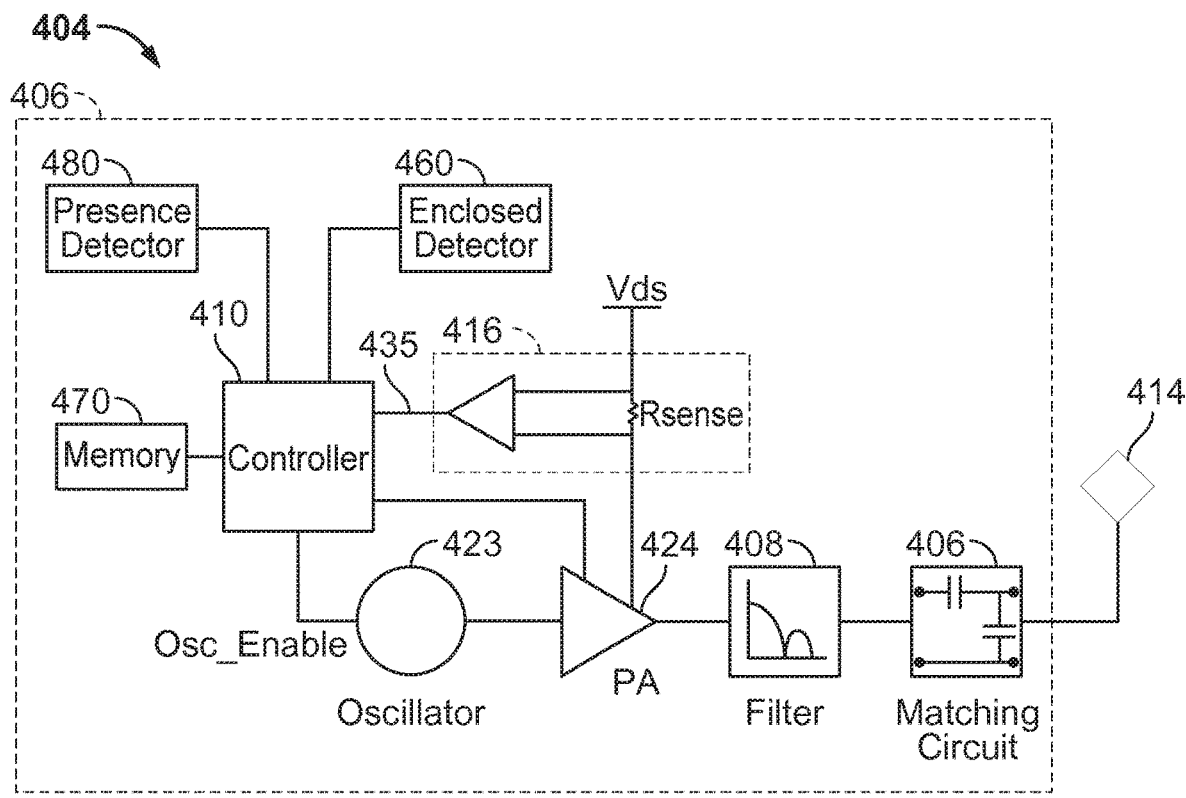
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

Figure 5:
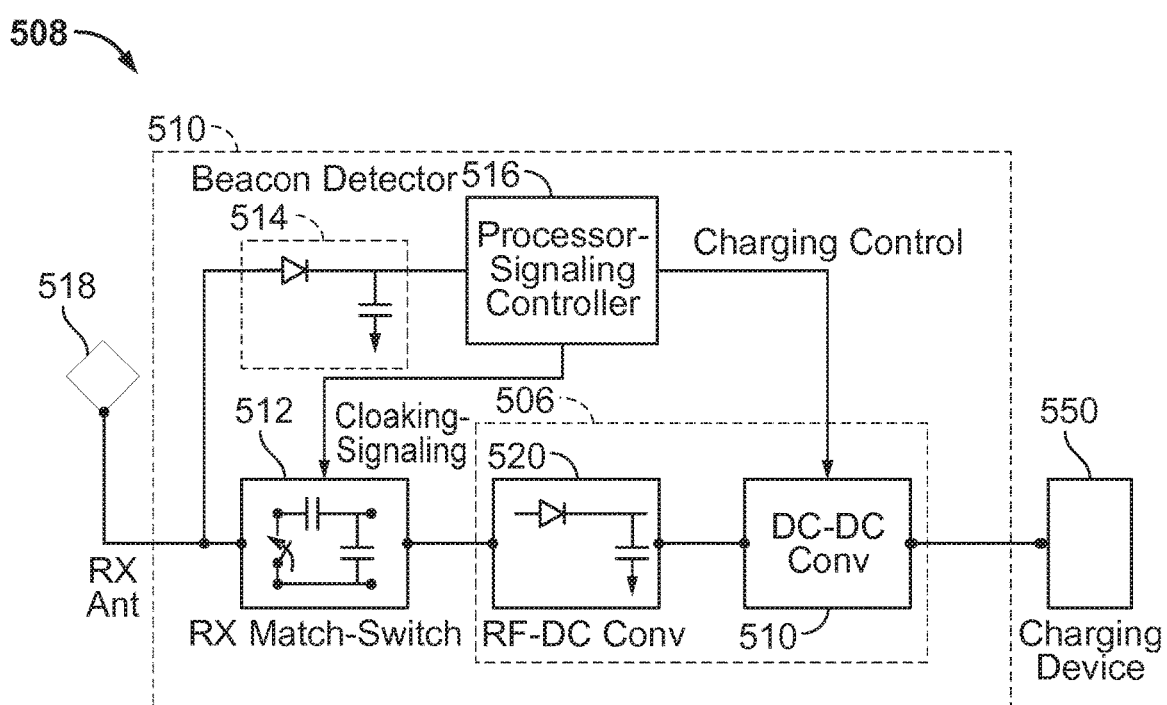
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

As described above, a wireless power transfer system may include a transmitter configured to generate a magnetic field, and a receiver configured to convert that magnetic field into electrical energy. The receiver may be interconnected with a device to be charged (DTBC). In various embodiments, the device to be charged can include a portable electronic device such as a mobile phone or a tablet computer. The receiver can provide electrical energy to the device to be charged when it is placed in the magnetic field created by the transmitter. The system can transfer power from a transmitter coil to a receiver coil via magnetic induction.

The amount of power that may be transferred, and the efficiency at which it can be transferred, can depend on the magnetic coupling between the transmitter and receiver coil. Magnetic coupling can be influenced by various factors such as coil geometry, relative coil positioning, coil shielding, and the presence of metal. Generally, a wireless power system is designed to operate while the device to be charged is placed flat on the charging surface and while the transmitter and receiver coils aligned and parallel with each other.

In various embodiments, certain devices to be charged may include wireless power receivers that can receive charging power in multiple positions. Such multi-position charging devices can allow a device, such as a tablet computer, to receive charging power both while it is lying flat on a charging surface, as shown in FIG. 6A, and while it is in a standing position as shown in FIG. 6B.

In practice, supporting variable positions may be challenging. To maintain wireless power transfer sufficient to meet design goals, a receiver coil design may account for both the coil's proximity to metal (including the device to be charged) and the coil's relative position with the transmitter pad. It may be difficult to support the differing consumer use models shown in FIG. 6A and FIG. 6B with a single receiver coil that maintains its relative position to both the device to be charged and the transmit coil. In some cases, it may be possible for a single receive coil to support multiple charging positions. However, a single-coil design may also result in increased cost, awkward use models, or a degradation of wireless power performance.

Figure 6A:
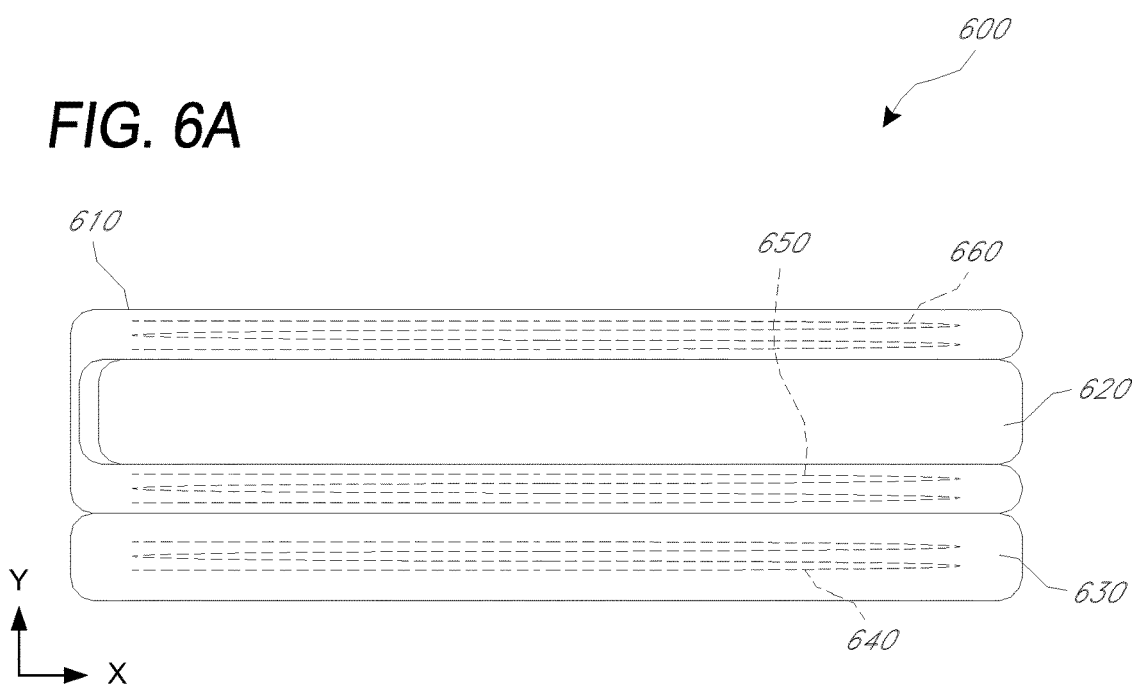
FIG. 6A is a diagram of an exemplary wireless power transfer system, in a first configuration.
Figure 6B:
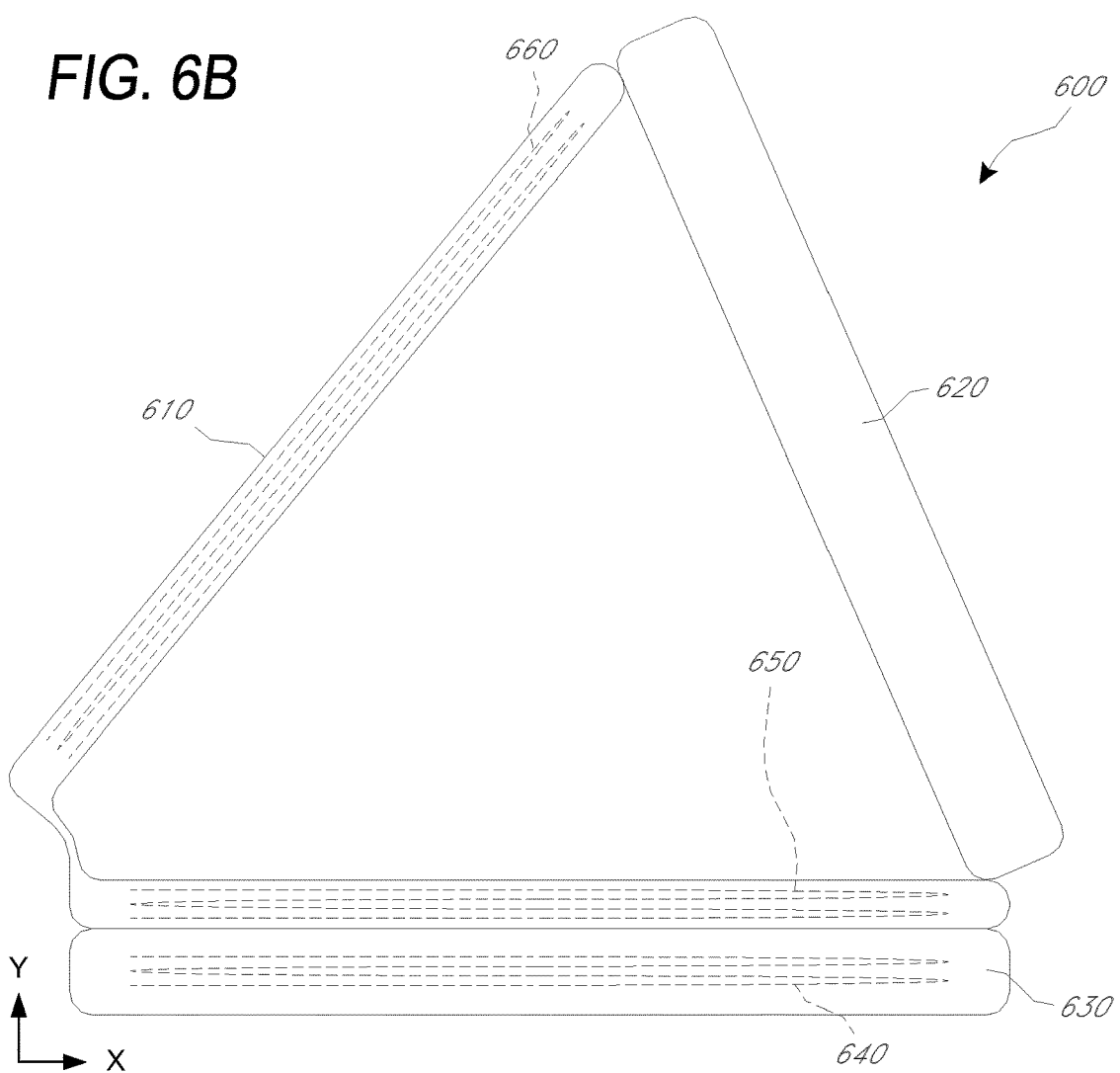
FIG. 6B is a diagram of an exemplary wireless power transfer system, in a second configuration.
Figure 6C:
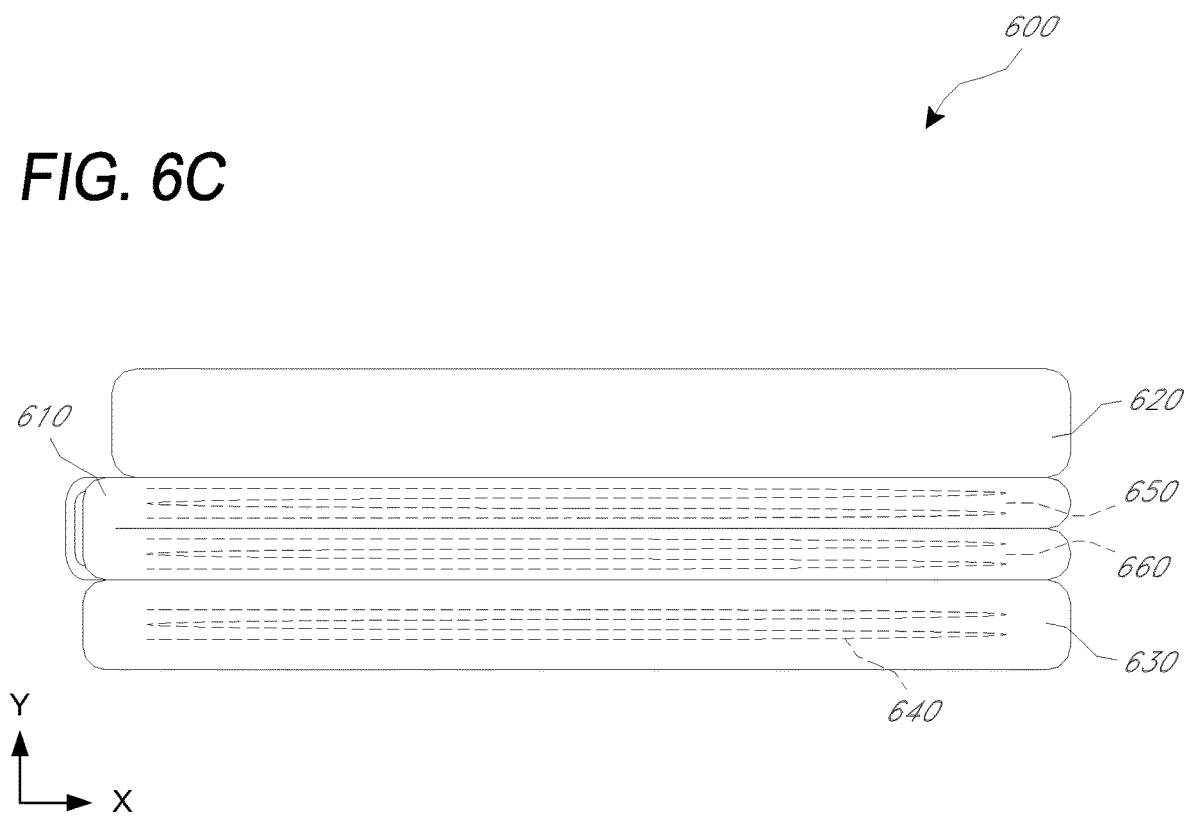
FIG. 6C is a diagram of an exemplary wireless power transfer system, in a third configuration.

According to one embodiment, a wireless power receiver can use multiple, variably oriented receiver coils to support a plurality of use cases, such as those shown in FIGS. 6A-6C. Additionally, the principle of multiple-coil receivers can allow two or more low-power transmit coils to supply power for a single, high-power receiver. A single receiver electronics board may support both receiver coils. In this example embodiment, a single receiver board and two receiver coils integrated into a computing device case may allow a computing device, such as a tablet computer, to charge in the three positions shown in FIGS. 6A-6C, which will be described in further detail below.

FIG. 6A is a diagram of an exemplary wireless power transfer system 600, in a first configuration. In the illustrated embodiment, the wireless power transfer system 600 includes a receiver 610 connected to a DTBC 620, and a transmitter 630. In an embodiment, the receiver 610 can be, for example, a cover for the DTBC 620. In various embodiments, the DTBC 620 can be an electronic device such as, for example, a computing device, a tablet computer, a cellular telephone, etc. The transmitter 630 can be, for example, a charging pad. The first configuration can be referred to as a "flat" position. In various embodiments, the "flat" position can include any rotation of the receiver 610, the DTBC 620, and/or the transmitter 630 about the Y-axis.

The receiver 610 can be configured to receive wireless charging power from the transmitter 630. In an embodiment, the receiver 610 can include one or more aspects of the receiver 108 (FIG. 1), 208 (FIG. 2), and/or 508 (FIG. 5). The receiver 610 can include two or more receive coils 650 and 660 configured receive power transfer from at least one transmit coil 640 in the transmitter 630. In an embodiment, the receiver 610 includes the receive coils 650 and 660, and some or all of the receiver circuitry described above with respect to FIGS. 1-5 can be included in the DTBC 620. In an embodiment, the receiver 610 can have a housing including a non-ferrous material such as, for example, plastic, leather, etc.

The transmitter 630 can be configured to transmit wireless charging power to the receiver 610. The transmitter 630 can include one or more aspects of the transmitter 104 (FIG. 1), 204 (FIG. 2), and/or 504 (FIG. 5). In an embodiment, the transmitter 630 includes at least one transmit coil 640 configured to provide power transfer to the two or more receive coils 650 and 660 in the receiver 610.

In an embodiment, the two or more receive coils 650 and 660 can be variably oriented, both with respect to each other, and with respect to the transmit coil and/or the DTBC 620. As shown in FIG. 6A, the wireless power transfer system 600 is in a first configuration. The first configuration shown in FIG. 6A can correspond to, for example, an embodiment where a tablet (the DTBC 620) is enclosed in a cover (the receiver 610), and laying on a charging pad (the transmitter 630). As shown, a first receive coil 650 and a second receive coil 660 are oriented at substantially the same angle with respect to the transmit coil 640.

In various embodiments, the first and second receive coils 650 and 660 can be designed for substantially the same frequency of operation. For example, the first and second receive coils 650 and 660 can be designed to operate within a 10% frequency deviation. As another example, the first and second receive coils 650 and 660 can be designed to operate within a 5% frequency deviation. the first and second receive coils 650 and 660 can be designed to operate within a 1% frequency deviation, or more particularly, a 0.1% frequency deviation.

Referring still to FIG. 6A, the first receive coil 650 is closer to the transmit coil 640, and may therefore receive more wireless charging power than the second receive coil 660. In an embodiment, the DTBC 620 may include a material that interferes with wireless power transfer such as, for example, a ferrous housing or other interfering material. Because the DTBC 620 is between the second receive coil 660 and the transmit coil 640, the second receive coil 660 may receive less wireless charging power than the second receive coil 660.

In an embodiment, as will be described in greater detail herein, the receiver 610 can detect that the second receive coil 660 receives less wireless charging power in the first configuration, and may select the first receive coil 650 to receive the wireless charging power when the wireless power transfer system 600 is in the first configuration.

FIG. 6B is a diagram of an exemplary wireless power transfer system 600, in a second configuration. In the illustrated embodiment, the wireless power transfer system 600 includes the receiver 610 connected to the DTBC 620, and the transmitter 630. As shown, the receiver 610 and the DTBC 620 are oriented such that the DTBC 620 is in a "standing" position. The DTBC 620 may be oriented in the "standing" position, for example, in embodiments where the DTBC includes a screen that may be preferably viewed in an inclined orientation. In an embodiment, a portion of the receiver 610 including the first receive coil 650 can support the DTBC in the "standing" position. In various embodiments, the "standing" position can include any rotation of the receiver 610, the DTBC 620, and/or the transmitter 630 about the Y-axis.

As shown in FIG. 6B, in the second configuration, the first receive coil 650 is closer to the transmit coil 640 than the second receive coil 660. Moreover, the first receive coil 650 is oriented at substantially the same angle as the transmit coil 640. On the other hand, the second receive coil 660 is oriented at an inclined angle, with respect to one or more of the first receive coil 650, the transmit coil 640, and the DTBC 620. Accordingly, in the second configuration, the second receive coil 660 may receive less wireless charging power than the first receive coil 650. In an embodiment, as will be described in greater detail herein, the receiver 610 can detect that the first receive coil 650 receives more wireless charging power in the second configuration, and may select the first receive coil 650 to receive the wireless charging power when the wireless power transfer system 600 is in the second configuration.

FIG. 6C is a diagram of an exemplary wireless power transfer system 600, in a third configuration. In the illustrated embodiment, the wireless power transfer system 600 includes the receiver 610 connected to the DTBC 620, and the transmitter 630. As shown, the receiver 610 and the DTBC 620 are oriented such that the DTBC 620 is in a "flat uncovered" position. The DTBC 620 may be oriented in the "flat uncovered" position, for example, in embodiments where the DTBC includes a screen that may be preferably viewed when laying flat on a charging pad. In various embodiments, the "flat uncovered" position can include any rotation of the receiver 610, the DTBC 620, and/or the transmitter 630 about the Y-axis.

As shown in FIG. 6C, in the third configuration, the second receive coil 660 is closer to the transmit coil 640 than the first receive coil 650. However, unlike the first configuration, the DTBC 620 may not substantially interfere with wireless power transfer between the transmit coil 640 and the first receive coil 650. Accordingly, in the third configuration, the first receive coil 650 may receive approximately the same wireless charging power as the second receive coil 660. In an embodiment, as will be described in greater detail herein, the receiver 610 can detect that the second receive coil 660 receives approximately the same wireless charging power in the third configuration, and may select both the first receive coil 650 and the second receive coil 660 to receive the wireless charging power when the wireless power transfer system 600 is in the third configuration.

Figure 6D:
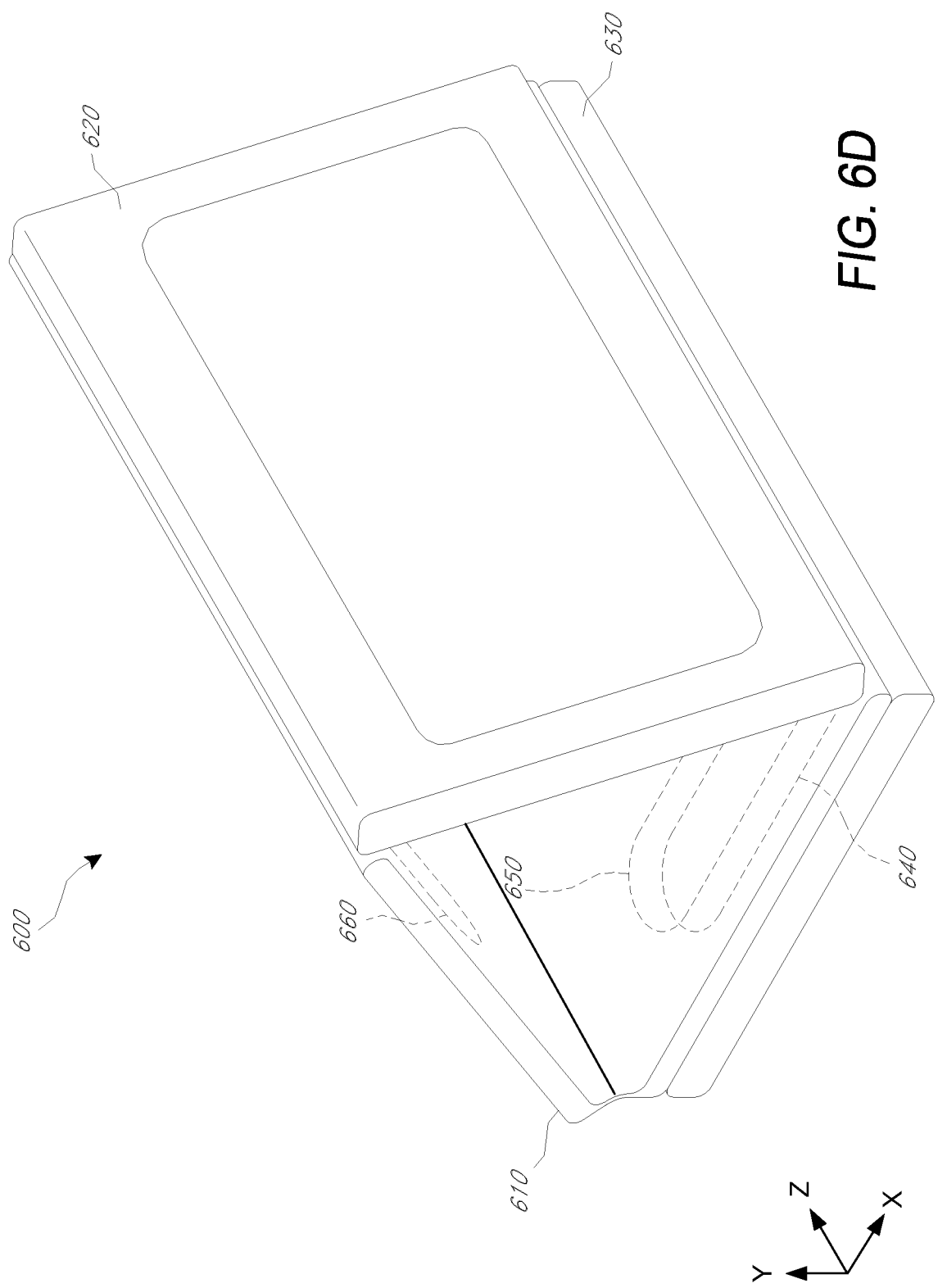
FIG. 6D is a perspective view of the exemplary wireless power transfer system of FIG. 6B.

FIG. 6D is a perspective view of the exemplary wireless power transfer system of FIG. 6B. In the illustrated embodiment, the wireless power transfer system 600 includes the receiver 610 connected to the DTBC 620, and the transmitter 630. As shown, the receiver 610 and the DTBC 620 are oriented such that the DTBC 620 is in the "standing" position. In various embodiments, the "standing" position can include any rotation of the receiver 610, the DTBC 620, and/or the transmitter 630 about the Y-axis.

Figure 7:
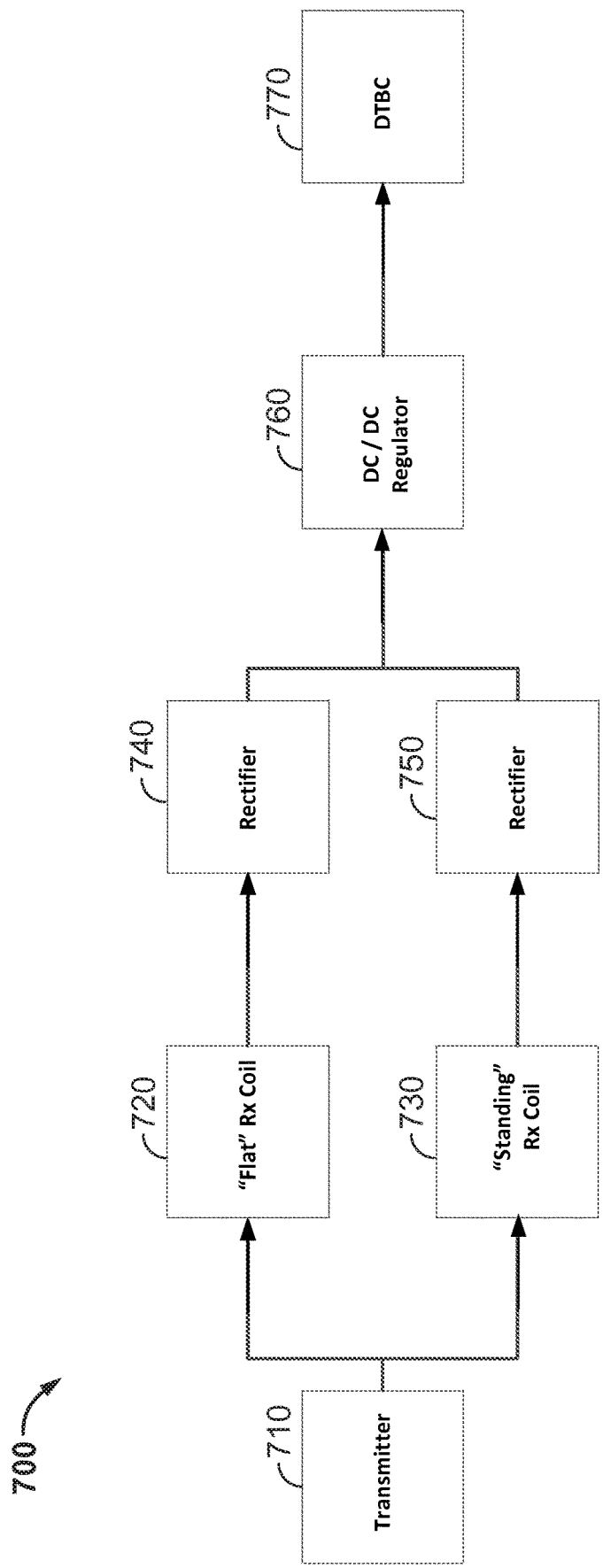
FIG. 7 is a simplified block diagram of an exemplary wireless power transmission system.

FIG. 7 is a simplified block diagram of an exemplary wireless power transmission system 700. The wireless power transmission system 700 includes a transmitter 710, a "flat" RX coil 720, a "standing" RX coil 730, first and second rectifiers 740 and 750, a DC/DC regulator 760, and a DTBC 770. In an embodiment, the transmitter 710 can be, for example, the transmitter 630 (FIG. 6B). The "flat" RX coil 720 can be, for example, the second receive coil 660 when the wireless power transmission system 600 is in the second configuration. The DTBC 770 can be, for example, the DTBC 620. In various embodiments, the rectifiers 740 and 750, and/or the DC/DC regulator 760 can be included in either the receiver 610 and/or the DTBC 770.

As shown in FIG. 7, each receive coil 650 and 660 may be connected to a dedicated rectifier circuit 740 and 750, respectively, which can be configured to convert the AC coil voltage to an unregulated DC voltage. The outputs of these the first and second regulators 740 and 750 can be connected in parallel to a voltage regulator 760. The voltage regulator 760 can convert the unregulated DC voltage into an appropriate regulated DC voltage for the DTBC 770. In an embodiment, the two rectifiers act in a diode OR configuration. In an embodiment, whichever receive coil 650 or 660 is in closest proximity to the transmit coil 640 will have a higher induced voltage. Accordingly, the rectifier associated with the receive coil 650 or 660 having the higher induced voltage may conduct into the regulator 760.

Figure 8:
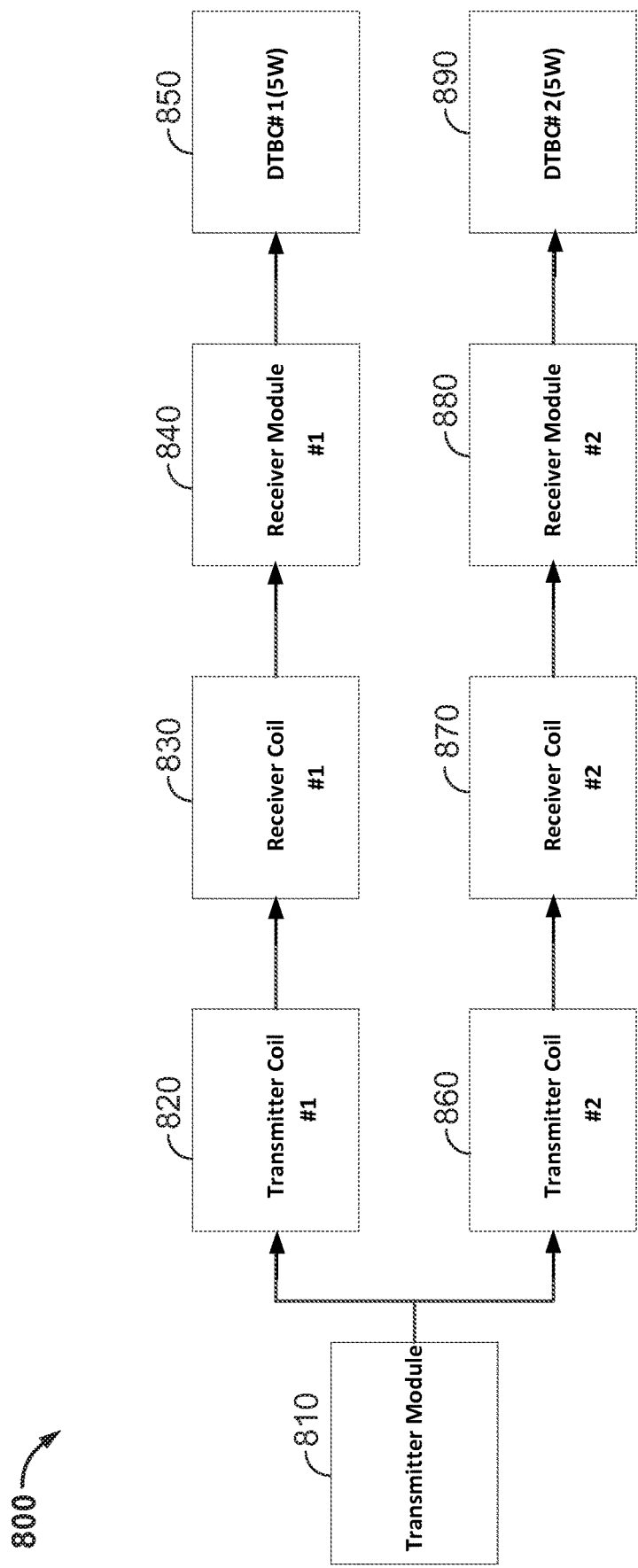
FIG. 8 is another simplified block diagram of an exemplary wireless power transmission system.

FIG. 8 is another simplified block diagram of an exemplary wireless power transmission system 800. In an embodiment, multiple transmitter coils can also be used to supply power to a multiple DTBCs. The wireless power transmission system 800 includes a transmitter 810, a first transmit coil 820, a first receive coil 830, a first receiver 840, a first DTBC 850, a second transmit coil 860, a second receive coil 870, a second receiver 880, and a second DTBC 890.

As shown in FIG. 8, the transmitter 810 includes the first transmit coil 820, which is configured to supply power to a first receive coil 830. The first receiver 840 can include the first receive coil 830. In an embodiment, the first receiver 840 can convert an AC signal received from the first receive coil 830 into a regulated DC signal for supply to the first DTBC 850. In an embodiment, the first DTBC 850 can be a 5 W device.

Referring still to FIG. 8, the transmitter 810 includes the second transmit coil 860, which is configured to supply power to a second receive coil 870. The second receiver 880 can include the second receive coil 870. In an embodiment, the second receiver 880 can convert an AC signal received from the second receive coil 870 into a regulated DC signal for supply to the second DTBC 890. In an embodiment, the second DTBC 890 can be a 5 W device.

Figure 9:
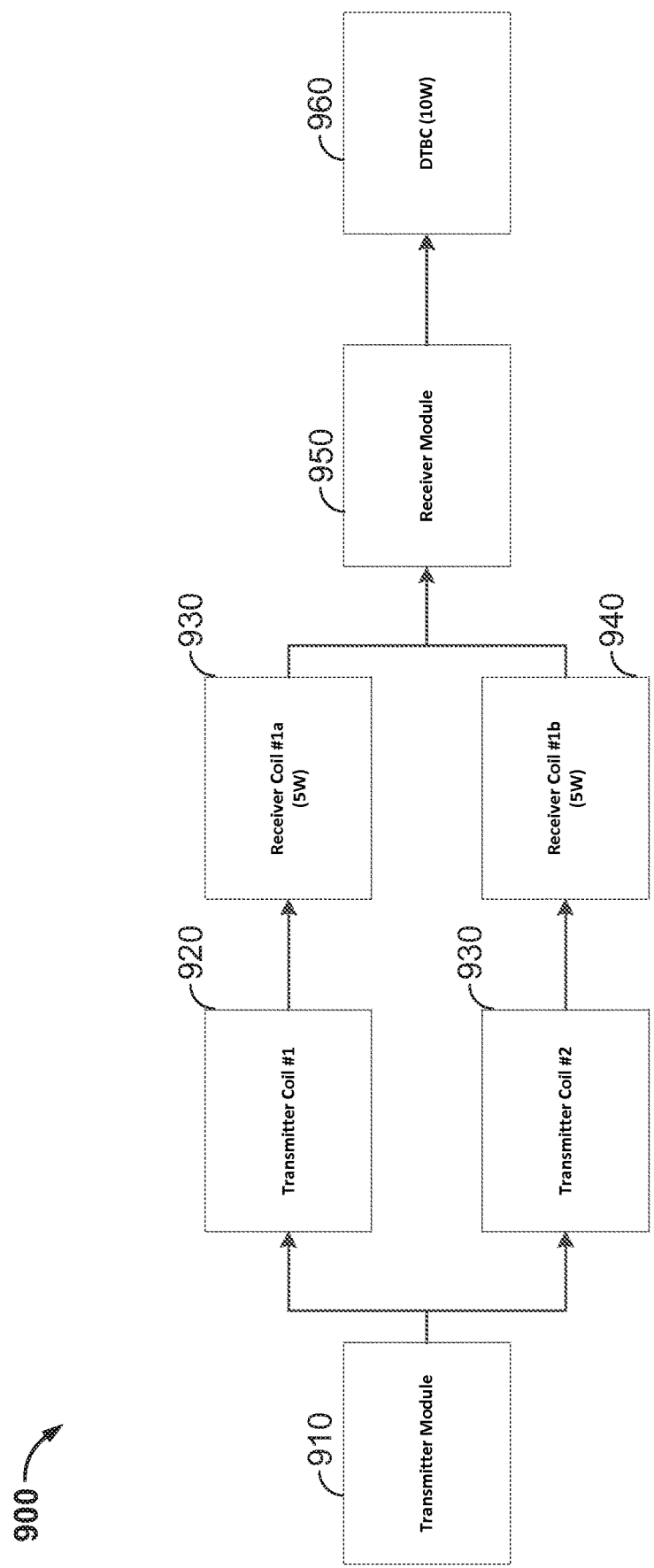
FIG. 9 is yet another simplified block diagram of an exemplary wireless power transmission system.

FIG. 9 is yet another simplified block diagram of an exemplary wireless power transmission system 900. In an embodiment, multiple receiver coils can also be used to allow multiple "low-power" transmit coils to supply power to a multiple "high-power" DTBC. The block diagram in FIG. 9 depicts a wireless power system in which two transmitter coils are each capable of concurrently providing 5 W to a receiver coil. In this system, there is a 1:1 relationship between the number of transmitter coils and the number of receiver coils. As shown in FIG. 9, the wireless power transmission system 900 includes a transmitter 910. The transmitter 910 includes a first transmit coil 920 and a second transmit coil 930.

Referring still to FIG. 9, the first transmit coil 920 is configured to supply wireless charging power to a first receive coil 930. In an embodiment, the first receive coil 930 can have a first received power limit such as, for example, 5 W. The second transmit coil 930 is configured to supply wireless charging power to a second receive coil 940. In an embodiment, the second receive coil 940 can have a second received power limit such as, for example, 5 W.

A receiver 950 can include both the first receive coil 930 and the second receive coil 940. The receiver 950 can be configured to convert an AC signal received from the first and second receive coils 930 and 940 into a regulated DC signal for supply to a high-power DTBC 960. In an embodiment, the first DTBC 960 can have a power draw higher than the power limit of any one receive coil 930 and 940. For example, the first DTBC 960 can be a 10 W device.

Figure 10:
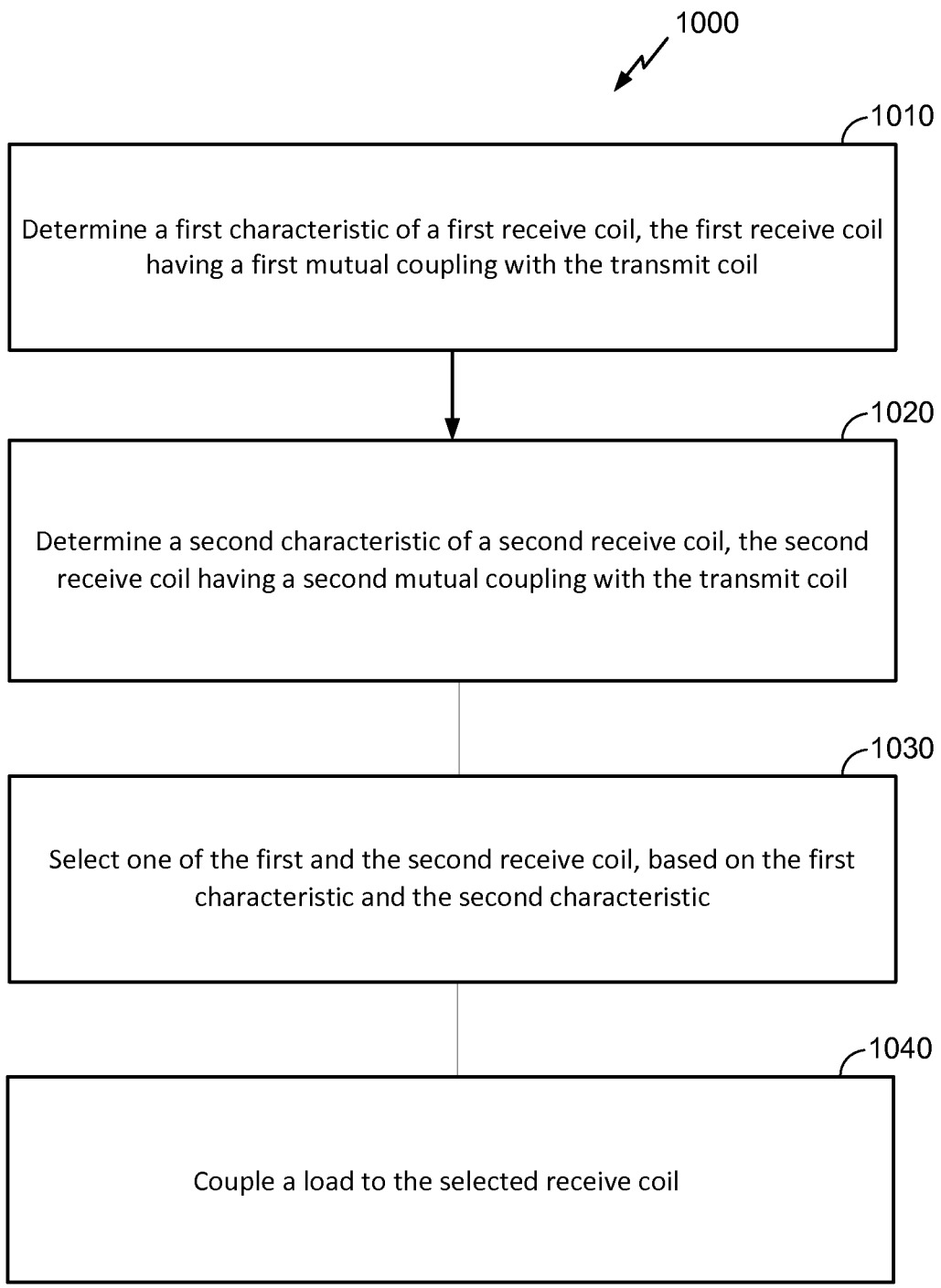
FIG. 10 shows a flowchart of an exemplary method for receiving wireless charging power.

FIG. 10 shows a flowchart 1000 of an exemplary method for receiving wireless charging power. The method can be implemented on one or more of the devices described above with respect to FIGS. 1-9. Although the method is described below with respect to elements of the receiver 610 (FIG. 6A-6C), those having ordinary skill in the art will appreciate that other components may be used to implement one or more of the steps described herein. Although blocks may be described as occurring in a certain order, the blocks can be reordered, blocks can be omitted, and/or additional blocks can be added.

First, at block 1010, the receiver 610 determines a first characteristic of the first receive coil 650. The first receive coil 650 has a first mutual coupling with the transmit coil 640. In an embodiment, the first characteristic can be a voltage at the first receive coil 650. In another embodiment, the first characteristic can be a mutual inductance between the first receive coil 650 and the transmit coil 640. In an embodiment, the receiver 610 can determine the first characteristic using one or more of the first rectifier 740 and the second rectifier 750 (FIG. 7).

Next, at block 1020, the receiver 610 determines a second characteristic of the second receive coil 660. The second receive coil 660 has a second mutual coupling with the transmit coil 640. In an embodiment, the second receive coil 660 can be designed for substantially the same frequency of operation as the first receive coil 650. In an embodiment, the second characteristic can be a voltage at the second receive coil 660. In another embodiment, the second characteristic can be a mutual inductance between the second receive coil 660 and the transmit coil 640. In an embodiment, the receiver 610 can determine the second characteristic using one or more of the first rectifier 740 and the second rectifier 750 (FIG. 7).

Then, at block 1030, the receiver 610 selects one of the first receive coil 650 and the second receive coil 660, based on the first characteristic and the second characteristic. For example, in an embodiment, the receiver 610 can select the receive coil 650 and/or 660 with a highest voltage. In another embodiment, the receiver 610 can select the receive coil 650 or 660 closest to the transmit coil 640. In an embodiment, one or more of the first and second rectifiers 740 and 750 can select the receive coil 650 and/or 660.

Subsequently, at block 1040, the receiver 610 couples a load to the selected receive coil 650 and/or 660. In an embodiment, the receiver 610 couples the load only to the selected receive coil 650 or 660. In another embodiment, the receiver 610 partially couples the load to the selected receive coil 650 or 660 and partially couples the load to the non-selected receive coil 650 or 660. In an embodiment, the non-selected receive coil 650 or 660 is coupled less than the selected receive coil 650 or 660.

Figure 11:
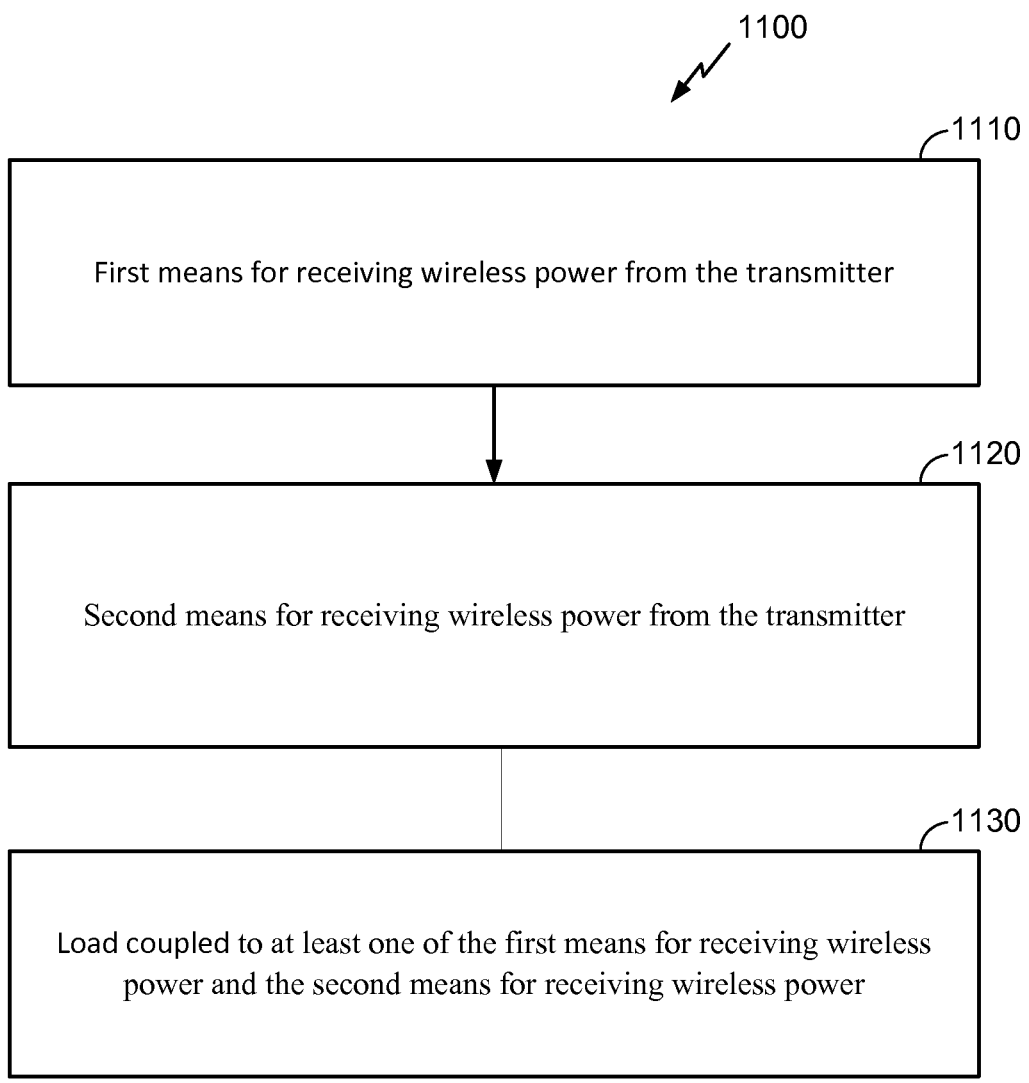
FIG. 11 is a functional block diagram of an exemplary wireless device that may be employed within the wireless power transfer system of FIG. 1.

FIG. 11 is a functional block diagram 1100 of an exemplary wireless device that may be employed within the wireless power transfer system of FIG. 1. The device 1100 comprises first means 1110 for receiving wireless power from the transmitter 630, second means 1120 for receiving wireless power from the transmitter 630, and a load coupled to the first means 1110 for receiving wireless power or the second means 1120 for receiving wireless power.

In an embodiment, the first means 1110 for receiving wireless power can be configured to perform one or more of the functions discussed above with respect to the block 1010 illustrated in FIG. 10. The first means 1110 for receiving wireless power may correspond to, for example, one or more of the receive coils 118 (FIG. 1), 218 (FIG. 2), 650 (FIG. 6), and/or 660. In an embodiment, the second means 1120 for receiving wireless power can be configured to perform one or more of the functions discussed above with respect to the block 1020 illustrated in FIG. 10. The second means 1120 for receiving wireless power may correspond to, for example, one or more of the receive coils 118 (FIG. 1), 218 (FIG. 2), 650 (FIG. 6), and/or 660.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power receiver configured to receive wireless power from a wireless power transmit coil, the wireless power receiver comprising:
a first receive coil having a first mutual coupling with the transmit coil and positioned at a first distance from the transmit coil;
a second receive coil having a second mutual coupling with the transmit coil and positioned at a second distance from the transmit coil, the first distance different than the second distance, the second receive coil designed for substantially the same frequency of operation as the first receive coil; and
a load configured to selectively couple to the first receive coil when the second distance is greater than the first distance and selectively couple to the second receive coil when the first distance is greater than the second distance, such that the load is able to receive the wireless power via the first receive coil or the second receive coil,
wherein an orientation of the first receive coil is variable with respect to an orientation of the second receive coil and an orientation of the transmit coil.

2. The wireless power receiver of claim 1, further comprising:
a first rectifier coupled to the first receive coil;
a second rectifier coupled to the second receive coil; and
a regulator configured to couple the first rectifier and the second rectifier to the load.

3. The wireless power receiver of claim 1, further comprising:
a rectifier coupled to the first receive coil and the second receive coil; and
a regulator configured to couple the rectifier to the load.

4. The wireless power receiver of claim 3, wherein the regulator is configured to receive, via the rectifier, power from one of the first receive coil and the second receive coil, based on a characteristic of the first receive coil and the second receive coil.

5. The wireless power receiver of claim 4, wherein the characteristic comprises a voltage at the first receive coil and the second receive coil.

6. The wireless power receiver of claim 4, wherein the characteristic comprises a mutual inductance between the first receive coil and the transmit coil, and between the second receive coil and the transmit coil.

7. The wireless power receiver of claim 1, wherein the wireless power receiver is further configured to receive wireless power from a second wireless power transmit coil, the first receive coil having a third mutual coupling with the second transmit coil, the second receive coil having a fourth mutual coupling with the second transmit coil.

8. A method of receiving wireless power from a wireless power transmit coil, the method comprising:
selecting a first receive coil when a first distance between the first receive coil and the transmit coil is less than a second distance between a second receive coil and the transmit coil, the first receive coil having a first mutual coupling with the transmit coil, the second receive coil having a second mutual coupling with the transmit coil, and the first receive coil designed for substantially the same frequency of operation as the second receive coil;
selecting the second receive coil when the second distance is less than the first distance; and
coupling a load to the selected receive coil, such that the load is able to receive the wireless power via the first receive coil or the second receive coil,
wherein an orientation of the first receive coil is variable with respect to an orientation of the second receive coil and an orientation of the transmit coil.

9. The method of claim 8, further comprising adjusting the orientation of the first receive coil with respect to an orientation of the second receive coil.

10. The method of claim 8, further comprising:
rectifying an output of the first receive coil;
rectifying an output of the second receive coil;
regulating, via a regulator, the output of the selected receive coil; and
receiving, at the regulator, power from one of the first receive coil and the second receive coil, based on a characteristic of the first receive coil and the second receive coil.

11. The method of claim 10, wherein the characteristic comprises a voltage at the first receive coil and the second receive coil.

12. The method of claim 10, wherein the characteristic comprises a mutual inductance between the first receive coil and the transmit coil, and between the second receive coil and the transmit coil.

13. The method of claim 8, further comprising selecting the receive coil with the greatest coupling to the transmit coil.

14. An apparatus for receiving wireless power from a wireless power transmitter, the apparatus comprising:
  first means for receiving wireless power from the transmitter positioned at a first distance from the transmitter;
  second means for receiving wireless power from the transmitter positioned at a second distance from the transmitter, the first distance different than the second distance, the second means for receiving wireless power designed for substantially the same frequency of operation as the first means for receiving wireless power; and
  a load configured to selectively couple to the first means for receiving wireless power when the second distance is greater than the first distance and selectively couple to the second means for receiving wireless power when the first distance is greater than the second distance, such that the load is able to receive the wireless power via the first means for receiving wireless power or the second means for receiving wireless power,
  wherein an orientation of the first means for receiving wireless power is variable with respect to an orientation of the second means for receiving wireless power and an orientation of the transmitter.

15. The apparatus of claim 14, further comprising:
  first means for rectifying coupled to the first means for receiving wireless power;
  second means for rectifying coupled to the second means for receiving wireless power; and
  regulating means for coupling the first means for rectifying and the second means for rectifying to the load.

16. The apparatus of claim 14, further comprising:
  means for rectifying coupled to the first means for receiving wireless power and the second means for receiving wireless power; and
  regulating means for coupling the means for rectifying to the load.

17. The apparatus of claim 16, wherein the regulating means is configured to receive, via the means for rectifying, power from one of the first means for receiving wireless power and the second means for receiving wireless power, based on a characteristic of the first means for receiving wireless power and the second means for receiving wireless power.

18. The apparatus of claim 17, wherein the characteristic comprises a voltage at the first means for receiving wireless power and the second means for receiving wireless power.

19. The apparatus of claim 17, wherein the characteristic comprises a mutual inductance between the first means for receiving wireless power and the transmitter, and between the second means for receiving wireless power and the transmitter.

20. The apparatus of claim 14, wherein the apparatus is further configured to receive wireless power from a second wireless power transmitter, the first means for receiving wireless power having a third mutual coupling with the second transmitter, the second means for receiving wireless power having a fourth mutual coupling with the second transmitter.

21. A non-transitory computer-readable medium comprising code that, when executed, causes an apparatus to:
  select a first receive coil when a first distance between the first receive coil and a transmit coil is less than a second distance between a second receive coil and the transmit coil, the first receive coil having a first mutual coupling with the transmit coil, the second receive coil having a second mutual coupling with the transmit coil, and the first receive coil designed for substantially the same frequency of operation as the second receive coil;
  select the second receive coil when the second distance is less than the first distance; and
  couple a load to the selected receive coil, such that the load is able to receive wireless power via the first receive coil or the second receive coil,
  wherein an orientation of the first receive coil is variable with respect to an orientation of the second receive coil and an orientation of the transmit coil.

22. The medium of claim 21, further comprising code that, when executed, causes the apparatus to adjust the orientation of the first receive coil with respect to an orientation of the second receive coil.

23. The medium of claim 21, further comprising code that, when executed, causes the apparatus to:
  rectify an output of the first receive coil;
  rectify an output of the second receive coil;
  regulate, via a regulator, the output of the selected receive coil; and
  receive, at the regulator, power from one of the first receive coil and the second receive coil, based on a characteristic of the first receive coil and the second receive coil.

24. The medium of claim 23, wherein the characteristic comprises a voltage at the first receive coil and the second receive coil.

25. The medium of claim 23, wherein the characteristic comprises a mutual inductance between the first receive coil and the transmit coil, and between the second receive coil and the transmit coil.

26. The medium of claim 21, further comprising code that, when executed, causes the apparatus to select the receive coil closest to the transmit coil.

27. The wireless power receiver of claim 2, wherein the first rectifier and the second rectifier are configured to act in a diode OR configuration, the first rectifier configured to conduct voltage to the regulator when a first induced voltage of the first receive coil is greater than a second induced voltage of the second receive coil, and the second rectifier configured to conduct voltage to the regulator when the second induced voltage is greater than the first induced voltage.

28. A wireless power receiver configured to receive wireless power from a wireless power transmit coil, the wireless power receiver comprising:
  a load configured to receive wireless power;
  a first receive coil having a first mutual coupling with the transmit coil and positioned at a first distance from the transmit coil;
  a second receive coil having a second mutual coupling with the transmit coil and positioned at a second distance from the transmit coil, the first distance different than the second distance, the second receive coil designed for substantially the same frequency of operation as the first receive coil, wherein an orientation of the first receive coil is variable with respect to an orientation of the second receive coil and an orientation of the transmit coil;
  a first rectifier coupled to the first receive coil;
  a second rectifier coupled to the second receive coil;

and a regulator configured to couple the first rectifier and the second rectifier to the load, such that the load is coupled to at least one of the first receive coil and the second receive coil, wherein the first rectifier and the second rectifier are configured to act in a diode OR configuration, the first rectifier configured to conduct voltage to the regulator when a first induced voltage of the first receive coil is greater than a second induced voltage of the second receive coil and when the first distance is less than the second distance, and the second rectifier configured to conduct voltage to the regulator when the second induced voltage is greater than the first induced voltage and when the second distance is less than the first distance.

* * * * *